United States Patent [19]

Miller et al.

[11] Patent Number: 4,864,176

[45] Date of Patent: Sep. 5, 1989

[54] STATOR SUPPORT STRUCTURE WITH STAMPED END PLATES

[75] Inventors: William H. Miller, Albany; James J. Grant, Schenectady, both of N.Y.

[73] Assignee: REM Technologies, Inc., Albany, N.Y.

[21] Appl. No.: 226,048

[22] Filed: Jul. 29, 1988

[51] Int. Cl.$^4$ .................... H02K 3/04; H02K 19/24
[52] U.S. Cl. .................... 310/194; 310/259; 310/171; 310/54; 310/168; 310/217
[58] Field of Search .............. 310/54, 60 A, 60 R, 310/166, 168, 171, 184, 194, 216, 217, 254, 259

[56] References Cited

U.S. PATENT DOCUMENTS

| | | | |
|---|---|---|---|
| 437,501 | 9/1890 | Morday | 310/168 |
| 1,122,187 | 12/1914 | Behrend | 310/260 |
| 2,519,097 | 8/1950 | Allen | 171/252 |
| 3,241,111 | 3/1966 | Sandstrom | 310/42 |
| 3,328,735 | 6/1967 | Honsinger | 310/216 |
| 3,912,958 | 10/1975 | Steen | 310/168 |
| 4,786,834 | 11/1988 | Grant et al. | 310/259 |

FOREIGN PATENT DOCUMENTS 0115147 9/1981 Japan .................... 310/259

Primary Examiner—Patrick R. Salce
Assistant Examiner—Judson H. Jones
Attorney, Agent, or Firm—Heslin & Rothenberg

[57] ABSTRACT

A spool-like stator support structure for an inductor type dynamoelectric machine incorporates stamped, annular end plates. Each end plate has a plurality of spaced-apart recessed landings along its outer edge and, preferably, a plurality of axially outward extending tabs which cooperate to precisely position a plurality of circumferentially distributed generally U-shaped armature elements mounted thereon. The end plate is also provided with a rabbet or press fit along its radially inner edge for mating with an end of the central cylindrical tube of the spool-like support. Cooling ports also distributed about the inner edge of the laminated end plate provide for ventilation of the exterior of said central tube. The end plate can be assembled from a grouping of standardized stampings or from a single stamping.

20 Claims, 7 Drawing Sheets

FIG. 1a

STATOR SUPPORT STRUCTURE WITH STAMPED END PLATES

BACKGROUND OF THE INVENTION

1. Technical Field

This invention relates generally to inductor type rotating dynamoelectric machines and, more specifically, to an improved support structure for the stator assembly of such machines.

2. Background Art

Inductor type dynamoelectric machines have been employed, in the past, to realize high-speed operation, particularly for electrical generation. Such machines are generally characterized by a stator which includes both AC armature and DC excitation coils, surrounding a coil-less rotor. Since there are no rotating field or armature coils in this type of dynamoelectric machine, slip rings, brushes and associated connections, common to machines having rotating windings, may be entirely eliminated. This feature, coupled with the typical solid construction of the machine rotor, makes the inductor machine particularly adaptable to high rotational speed applications.

One known version of an inductor type dynamoelectric machine, employs a circumferentially distributed arrangement of "C" or "U" shaped armature elements surrounding a generally cylindrical field coil which in turn encloses a transverse pole magnetic rotor. U.S. Pat. Nos. 437,501, and 2,509,097 and 3,912,958 describe earlier machines of this general design. Such machines typically employed frame mounted hardware for supporting the components of the stator and suffered from deficiencies attendent to this construction.

A more recent version of such an inductor type machine is disclosed in commonly owned U.S. Pat. No. 4,786,834 issued Nov. 22, 1988 in the name of James J. Grant et al. The improvement described therein encompasses a spool-like support structure for supporting the field winding and armature elements from inside and for accurately positioning the armature elements. The spool-like structure is made of non-magnetic material and has a hollow, elongated central portion extending concentrically about a longitudinal axis. This central portion supports a field coil and defines an interior longitudinal passageway for accommodating the insertion of a coaxial rotor. At each end of the central portion, end portions extend radially outward therefrom. Each of these end portions is preferably provided with radially oriented grooves in its axially outermost surface. The grooves are configured to receive and orient legs of generally U-shaped armature core elements arrayed in a circumferentially distributed pattern about the periphery of the spool-like structure. The end portions of the spool-like structure are axially spaced and radially dimensioned, and the grooves in the outer face of each end portion are angularly spaced so as to precisely position the armature elements in three orthogonal directions.

The earlier application also contemplates, for cooling purposes, the provision of cooling ports in the central portion of the spool-like structure. These ports are located near the ends of the central portion and advantageously communicate with extended recesses in the surface of a rotor mounted for rotation within the central portion. The rotor acts as an impeller and centrifugally propels cooling fluid through said cooling ports and into the vicinity of the field winding and armature coils.

Other features, advantages and benefits of this recently developed, highly acclaimed dynamoelectric machine are detailed in U.S. Pat. No. 4,786,834 issued Nov. 22, 1988, the disclosure of which is incorporated by reference herein.

In practice, the end portions of the spool-like stator support have previously been fabricated as machined one piece parts. These machined parts, although satisfactory in operation, are relatively difficult, time-consuming and accordingly, expensive to manufacture. Also, it would be desirable to be able to further reduce stray flux and eddy current losses in such end pieces, to incorporate greater flexibility in their design, and to provide for ventilation through the end pieces, thereby simplifying fabrication of the central portion of the spool-like support structure.

SUMMARY OF THE INVENTION

These needs are satisfied, and additional benefits realized, in accordance with the principles of the present invention, by providing the spool-like stator supporting structure of an inductor type rotating dynamoelectric machine with stamped annular end plates. In a preferred laminate (i.e., multiple stamping) construction, each end plate has a rabbet along the radially inner edge near its axially inner surface. The rabbet is configured to mate with an end of a central cylindrical tube, the tube being concentric with a longitudinal axis and serving to support a stationary field winding. Each end plate is also provided with a plurality of circumferentially distributed recessed landings along its outer edge and, preferably, with a plurality of bent out-of-plane tabs extending away, e.g., generally axially from an axially outermost surface of said plate. The recessed landings and tabs cooperate to precisely position a plurality of stationary, generally U-shaped, longitudinally extending armature elements which are circumferentially distributed about and mounted on the spool-like support structure.

Each laminate end plate can also be provided with a plurality of through-cut axially extending cooling ports located along its radially inner edge. The ports are dimensioned to provide cooling fluid admittance to the space occupied by the field winding and armature coils.

The recessed landings around the outer circumference of the end plate are preferably curved such that they provide for desired arcuate positioning of the radially innermost ends of laminate armature elements supported thereby. Roving or other tieing means can be wound about such laminate elements near their radially innermost ends to reduce flaring thereof.

In another aspect of the present invention, each end plate consists of a grouping of coaxial, generally flat, standardized stampings. The standardized stampings are of three types: a first annular stamping having a central bore of first diameter, a second annular stamping having a central bore of second diameter less than said first diameter, and a third annular stamping having a plurality of radially convergent spokes which are bent out of plane to form the generally axially extending tabs. At least one, and preferably all of the stampings in a particular grouping, have a plurality of spaced recessed landings distributed about the outer circumference. The number and types of stampings in a grouping can vary providing flexibility in the axial extent and configuration of the end plates formed therefrom. In addition to this versatility, end plates constructed according to the principles of the present invention afford ventilation, increased efficiency and a very substantial reduction in manufacturinq costs Of the end plates.

In another aspect of the invention, the laminate end plates can be constructed without the axially extending tabs, particularly for small machine applications. A single stamping embodiment is also envisioned.

Accordingly, a principle object of the present invention is to provide an improved stator support structure for an inductor type dynamoelectric machine.

Another object is to provide end plates for a spool-like stator support structure which afford enhanced efficiency, lower cost construction, ready ventilation, and greater versatility, as well as accurate positioning in three orthogonal directions to an array of circumferentially distributed, U-shaped armature elements supported thereby.

A further object is to provide a stator support which is readily manufactured and assembled, reduces stray flux and eddy current losses, facilitates cooling fluid circulation, and otherwise enhances performance of an inductor type dynamoelectric machine.

BRIEF DESCRIPTIONS OF THE DRAWINGS

These and other objects, advantages and features of the present invention will be more readily understood from the following detailed description, when considered in conjunction with the accompanying drawings in which.

DETAILED DESCRIPTION

Figures 1, 1A:
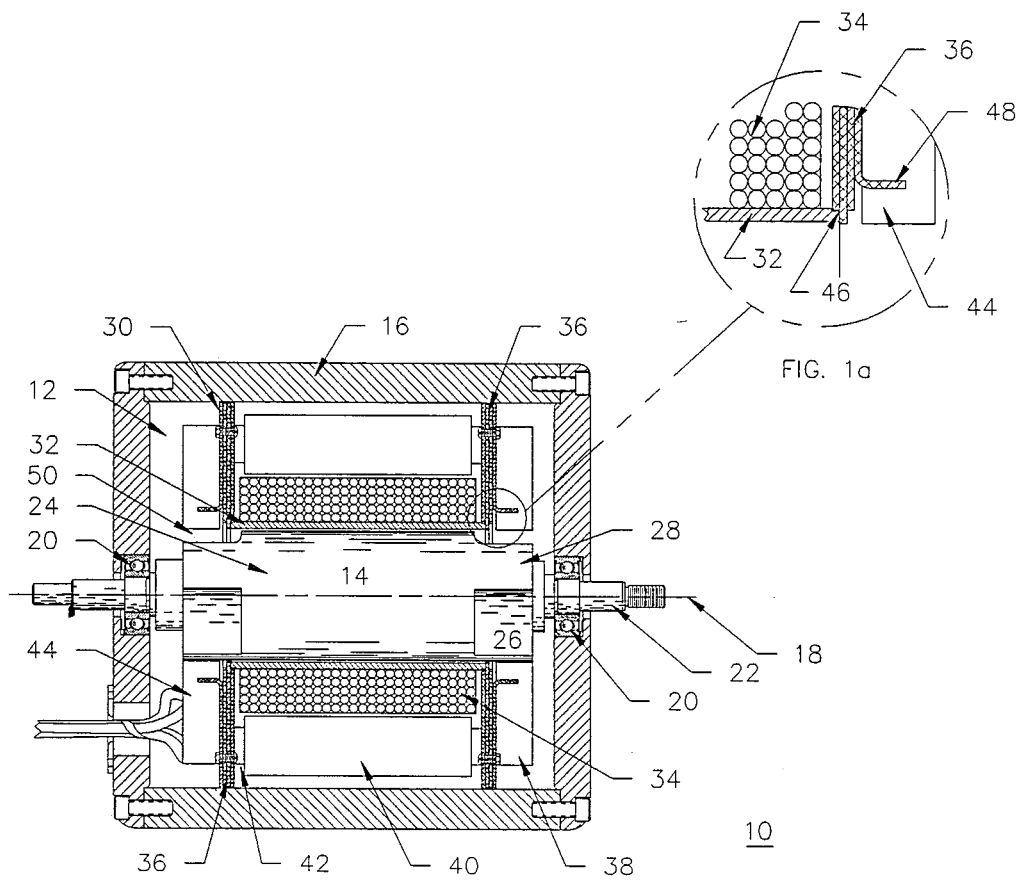
FIG. 1 is a cross-sectional view from the side of one embodiment of an inductor type dynamoelectric machine having a stator support structure constructed in accordance with the principles of the present invention.
FIG. 1a is a blow-up of a portion of the support structure of FIG. 1.

In FIG. 1, a transverse-pole AC inductor type rotating dynamoelectric machine, constructed in accordance with the principles of the present invention, is shown. The machine, generally denoted 10, includes a stationary stator assembly 12 surrounding a rotatable, coil-less rotor 14. A surrounding housing or frame 16, encloses stator assembly 12 and rotatably supports the ends of rotor 14.

Rotor 14 extends along and is coaxial with a longitudinal axis 18. The rotor preferably has a solid one-piece construction and is supported by bearings 20, at each end of rotor shaft 22. Bearings 20 are, in turn, supported by machine housing 16. Rotor 14 has a central cylindrical portion 24 provided with circumferentially spaced, axially extending surface recesses or cutouts 26 at the ends thereof, which define a desired number of lobes 28 at each end of the transverse pole rotor, in a manner known in the art. The rotor can be constructed of any available magnetic material, for example, carbon steel.

Stator assembly 12 includes an internal spool-like support structure 30 which is preferably interference fit within housing 16. Support structure 30 has a central, generally cylindrical portion or tube 32 which is coaxial with longitudinal axis 18 and defines an interior, longitudinally extending, central passageway for receiving rotor 14. Field (or DC excitation) windings 34 are coiled about and supported by the exterior surface of tube 32.

Stator support structure 30 also includes a pair of laminate end portions or plates 36 extending radially outward from the ends of tube 32. End portions 36 serve to mount and precisely position a plurality of circumferentially distributed, U-shaped (also referred to as C or arch shaped) armature core elements 38. Each armature core element 38 is preferably provided with an individual AC armature coil 40 wound about, and supported by a longitudinally extending base portion 42 of the armature element. Legs 44 extend radially inward from each end of base portion 42 of armature element 38. Armature core elements 38 are made of magnetic material while support structure 30 is composed of non-magnetic material, for example, aluminum.

As most clearly depicted in FIG. 1a., each end plate 36 of support structure 30 is of a laminate construction with a rabbet 46 along its inner edge to receive a mating end of tube 32, and preferably has outwardly extending tabs 48 for positioning legs 44 of armature elements 38. A detailed discussion of laminate end plates, constructed in accordance with the principles of the present invention, is presented hereinafter.

Operation of machine 10 is typical of synchronous AC machines in that, if electric current is applied to the field windings 34, and the rotor 14 is rotated by some external means, voltage will be induced in the armature windings 40 in the manner of a generator. Similarly, if the armature windings are energized in such a fashion as to produce a rotating flux wave at the gap 50, which exists between the radially innermost ends of armature elements 38 and the rotor lobe surfaces 28, as is done in polyphase, AC synchronous machines, the rotor 14 of the machine will be urged to follow the armature flux wave and rotate in the manner of an electric motor.

Figure 2:
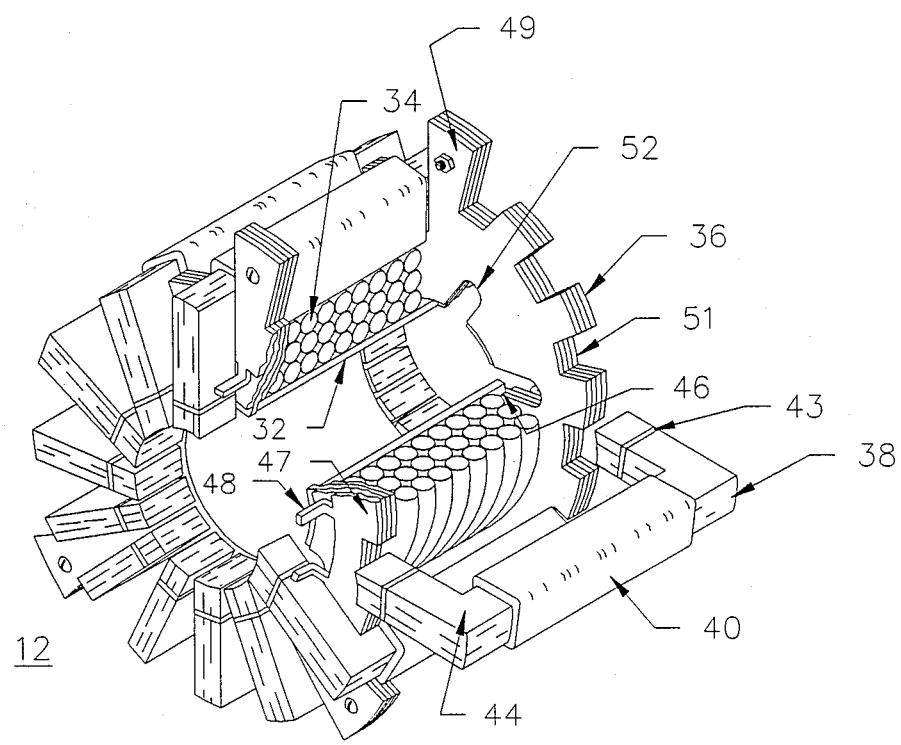
FIG. 2 is partially cut-away isometric view of a stator assembly incorporating an improved spool-like support structure with laminate end plates, constructed in accordance with the principles of the present invention.

FIG. 2 depicts, in partially cut-away perspective view, a stator assembly 12 of an inductor type rotating dynamoelectric machine incorporating a spool-like support structure having laminate end plates. In this FIG., as in all the FIGS., like elements are identified by like reference numbers and function in like manner.

Focusing now on the laminate end plates, as illustrated in FIG. 2, each end plate 36 of the stator support is provided with a plurality of spaced apart recessed landings 51 about its outer circumference for receiving and positioning the base portions of armature elements 38. The axially outer surface 47 of each end plate is provided with an array of outwardly extending tabs 48 which serve to space and orient the legs 44 of armature elements 38. In this fashion, a circumferentially distributed arrangement of armature elements 38 can be supported and precisely positioned in axial, radial and tangential directions.

As previously noted, end plate 36 is also provided with a rabbet 46 along th radially inner edge of its axially innermost surface 49. The rabbet 46 is configured to mate with a respective end of tube 32. Axially extending cooling ports 52 can advantageously be distributed about the inner bore of end plate 36 to allow admittance of cooling fluid to the vicinity of field windings 34 and armature coils 40.

In general, the laminate end plate of the present invention consists of a grouping or stack of coaxial annular stampings. Preferably, the grouping is formed by selecting and appropriately ordering stampings from a library of three standardized stampings. A first embodiment of a laminate end plate 36, constructed in accordance with the principles of the present invention, is shown in assembled, exploded and cross-sectional views in FIGS. 3, 4 and 5, respectively. As illustrated, end plate 36 consists of four coaxial and angularly aligned, stacked stampings: S1, S2, S1, and S3.

Figure 3:
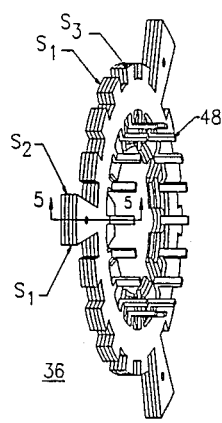
FIG. 3 is an isometric view of a laminate end plate assembled in accordance with the principles of the present invention.
Figure 4:
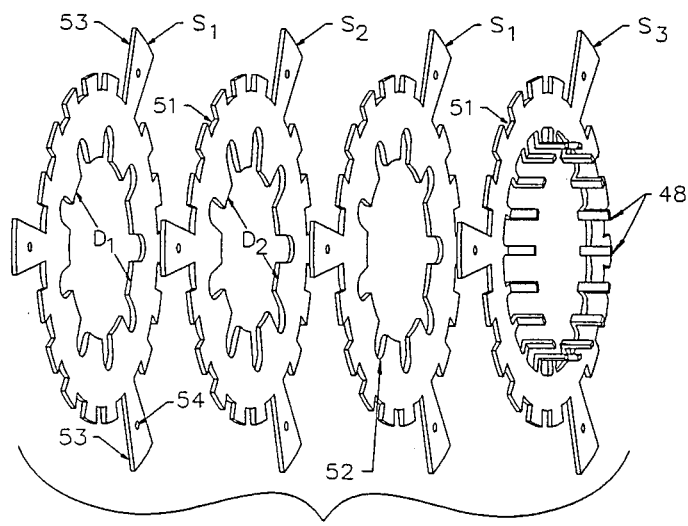
FIG. 4 is an exploded isometric view of the end plate of FIG. 3.
Figure 5:
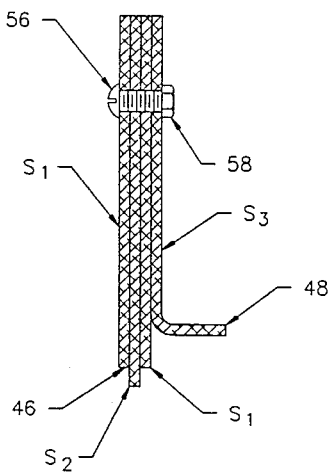
FIG. 5 is a sectional view taken along lines 5—5 of FIG. 3.
Figure 6:
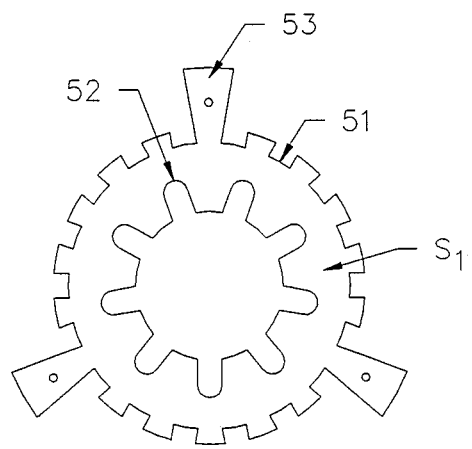
FIG. 6 is a plan view of a side of a first standardized stamping constructed in accordance with the principles of the present invention.
Figure 6A:
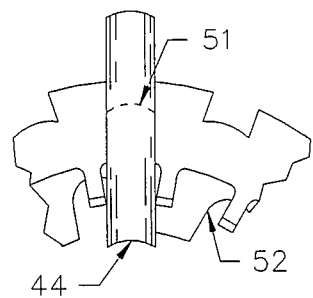
FIG. 6a is an enlarged view illustrating the effect of a rounded recessed landing upon a laminate armature element.

Referring now to FIGS. 6, and 6a, as well as FIGS. 3-5, it will be seen that first standardized stamping S1 has a flat annular configuration with a plurality of spaced apart recessed landings 51 circumferentially distributed about its outer edge. The landings are arranged and configured so as to position the radially inner ends of supported U-shaped armature elements at a desired radial distance and angular orientation relative to the longitudinal axis when the base portions of the armature elements are seated upon the recessed landings. If laminate armature elements are employed, the recessed landings 51 are rounded, as most clearly seen in FIG. 6a, such that the inner ends of the laminate armature elements lie on a desired circular locus. Roving or other tieing material 43 can be wound about the leg 44 of armature element 38 to reduce flaring of the armature laminations.

Stamping S1 is also provided with a set of radial extensions 53 which serve to center the stamping within the housing of the dynamoelectric machine. Each extension 53 can be provided with an aperture 54 extending axially therethrough to facilitate mechanical fastening of the stampings of the end plate.

As shown in FIG. 4, stamping S1 has a central bore of diameter D1, which is substantially equal to the outer diameter of tube 32. Distributed along this central bore of stamping S1 are a plurality of through-cut apertures or ports 52. Ports 52 are dimensioned to extend in a radial direction beyond the exterior of tube 32 and serve to admit cooling fluid to the exterior of the tube. The number, location, spacing, size, configuration, etc. of cooling ports 52 may vary from that shown so long as adequate ventilation is provided thereby in the vicinity of the field winding 34 and armature coils 40.

The second standardized stamping S2 has the same general configuration and outer dimensions as stamping S1 but its inner bore has a diameter D2 smaller than the diameter D1 of stamping S1 and preferably equal to or greater than the inner diameter of tube 32. Accordingly, when stampings S1 and S2 are stacked next to each other, an annular groove or rabbet 46 is formed along the radially inner edge, as clearly shown in FIG. 5. Rabbet 46 serves to mate end plate 36 to a corresponding end of central tube 32.

Figure 7:
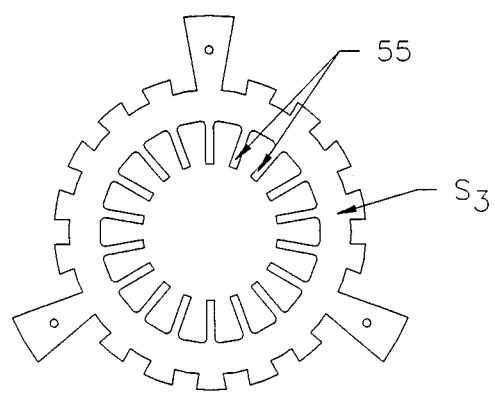
FIG. 7 is a plan view of a third standardized stamping constructed in accordance with the principles of the present invention.

The third standardized stamping S3, preferably has the same outer configuration and dimensions as stampings S1 and S2. However, as shown in the plan view of FIG. 7, initially stamping S3 is provided with a plurality of spaced-apart radially converging spokes 55 near its central bore. Spokes 55 are bent out of the plane of stamping S3 to form an array of tabs 48 which extend away from the flat surface 47 of stamping S3, preferably in a generally axial direction. Each tab 48 is positioned at an angular orientation, with respect to the longitudinal axis, which is intermediate that of adjacent recessed landings 51 in stamping S3. In this way, tabs 48 serve to space and tangentially position the legs 44 of armature elements 38. Tabs 48 need only extend out in the axial direction far enough to perform this function.

Laminate end plate 36 is composed of two S1 stampings and a single S2 and a single S3 stamping, arranged as shown in FIG. 4. The second S1 stamping, sandwiched between stampings S2 and S3, serves primarily as an axial spacer. As described more fully hereinafter, other groupings of the three standardized stampings can be employed, thereby providing flexibility in the configuration and depth of the laminate end plate. Non-magnetic mechanical securing means, such as bolt 56 and nut 58, shown in FIG. 5, can be employed to secure the stampings together, either permanently, or temporarily for assembly purposes.

Figure 8:
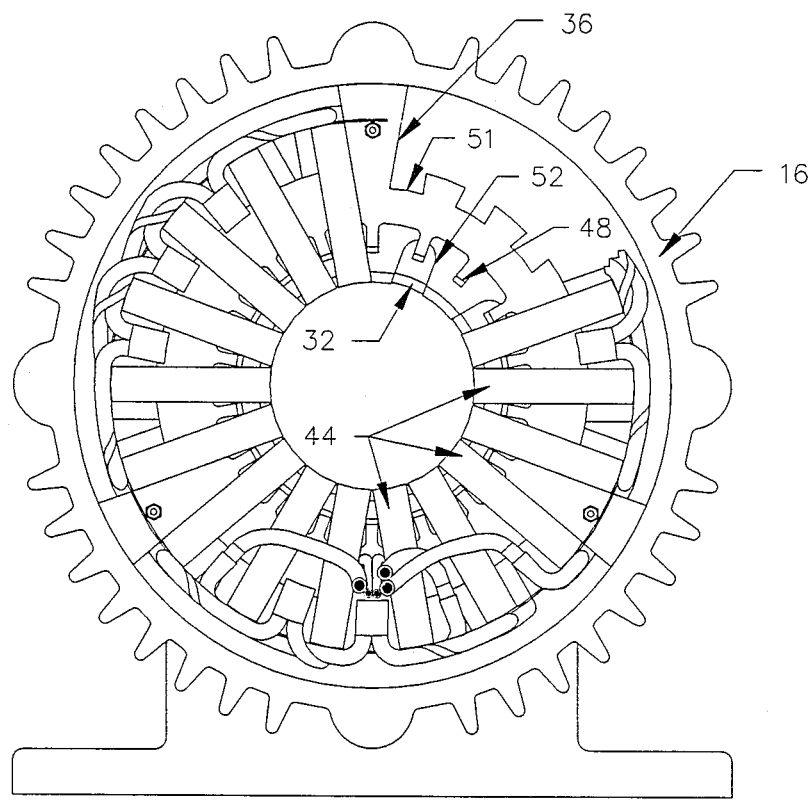
FIG. 8 is an end view of a stator assembly with a section removed, incorporating a support structure having an end plate constructed in accordance with the principles of the present invention.

FIG. 8 is a simplified, partially cut away end view of a stator assembly supported within housing 16 by a spool-like support structure incorporating the laminate end plates 36 of the present invention. As shown, arcuate recessed landings 51 of laminate end plate 36 serve to precisely position the radially inner ends of circumferentially distributed, support mounted armature elements 44 along a circular locus at a desired radial distance from the longitudinal axis, thereby creating a cylindrical bore in which the lobes of rotor 14 rotate. Outwardly extending tabs 48 serve to space and precisely position the legs of armature elements 44 tangentially. Axial positioning of armature elements 44 is realized through appropriate selection of the length of tube 32 and the axial extent of end plates 36. The end plates are maintained orthogonal to cylindrical tube 32 by the rabbet fit previously described. Ventilation about the field windings and armature coils is provided through cooling ports 52 which, as shown, extend in a radial direction beyond the outer surface of central tube 32.

In addition to precise armature element positioning in three orthogonal directions, the laminate end plates of the present invention provide numerous advantages. The laminate construction inherently minimizes eddy currents which might be caused by stray flux. Similarly, the sharp relief at the inner bore and slender tab construction result in less flux loss than the prior machined part. By employing a library of standardized stampings, flexibility of end plate design is achieved while the complexity and cost of fabrication is sharply reduced. The die and punch press operation used to fabricate the flat stampings facilitates rounding of the recessed landings and thus production of a truly rounded bore at the radially innermost ends of the laminate armature elements which in turn minimizes losses and improves machine performance. The laminate construction also allows for staggering of the outer extensions which support the end plate within the machine housing, if desired. Further, provision of the ventilation ports in the end plate rather than the central tube, simplifies the fabrication of the latter.

Figure 9:
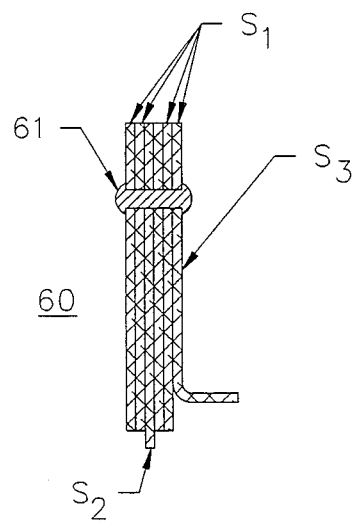
FIG. 9 is a cross-sectional depiction of an alternate embodiment of the end plate of the present invention.

FIG. 9 presents a cross-sectional illustration of another laminate end plate, constructed in accordance with the principles of the present invention. End plate 60 consists of a grouping of six of the standardized stampings, arranged, as shown, in the following order: S1, S1, S2, S1, S1, S3. The stampings may be fastened together by an aluminum rivet 61 or other comparable fastener, to form this thicker end plate.

Figure 10A:
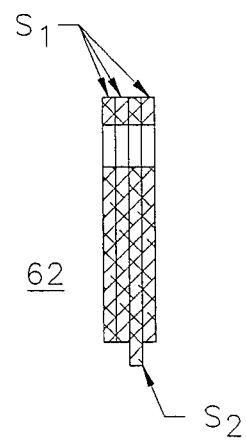
FIG. 10a is cross-sectional view taken along lines A—A of FIG. 10.
Figure 10:
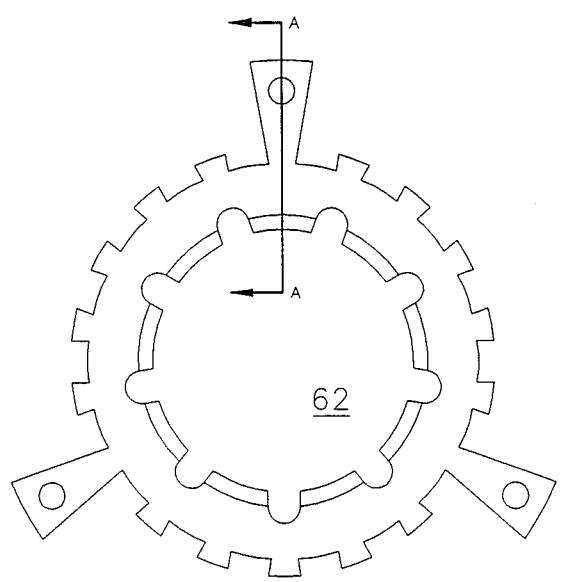
FIG. 10 is a plan view of another embodiment of an end plate constructed in accordance with the principles of the current invention.

FIG. 10 is a plan view from inside the support structure of still another embodiment of a laminate end plate constructed in accordance with the principles of the present invention. As more clearly seen in the cross-sectional view of FIG. 10a, laminate end plate 62 is formed from a grouping of 4 stampings: S1, S1, S2, and S1. For small machines, and fractional horsepower applications, it has been found that the outwardly extending tabs may be eliminated without compromising performance.

Figure 11:
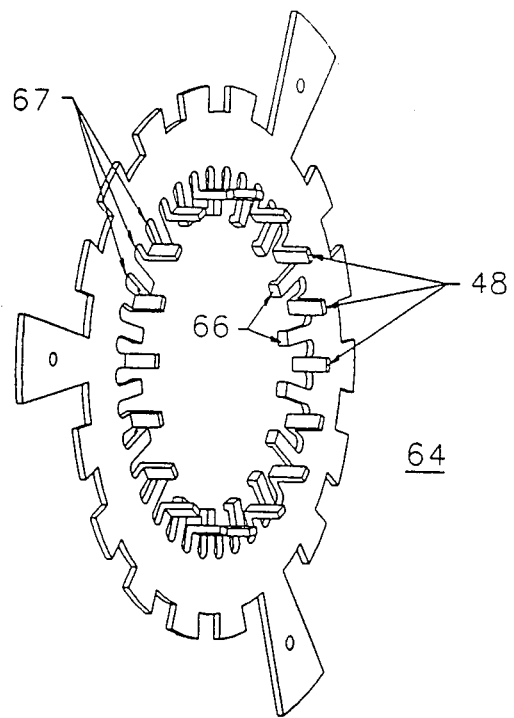
FIG. 11 is an isometric view of a single stamping end plate constructed in accordance with the principles of the present invention.

A perspective view of a simplified, alternate embodiment of an endplate contemplated by the present invention is presented in FIG. 11. End plate 64 consists of a single annular stamping having an outer circumferential configuration similar to that of the stampings earlier described. Around its central bore, this stamping is provided with a plurality of radially extending fingers or spokes. Alternate ones of these spokes are bent out of plane to form tabs 48 which, as earlier described, serve to tangentially position the radially projecting legs of the armature elements. Intermediate spokes 66 are bent out of plane in a direction opposite to tabs 48 and serve to provide a press fit about the exterior of an end of the central tube 32. The slots 67 formed between adjacent spokes serve as ventilation ports in this implementation.

From the foregoing description, it will be apparent that an improved stator support structure for inductor type dynamoelectric machines has been developed which is more efficient, versatile and economic and which thereby enhances machine performance. As compared to earlier machined end pieces, a comparable laminate end plate constructed in accordance with the principles of the present invention, has resulted in a reduction in end plate manufacturing costs by two orders of magnitude. With this invention, all of the objects previously stated are achieved, and the state of the art in the inductor type dynamoelectric machine field is thereby advanced.

Although specific embodiments of the invention have been described and depicted herein, it will be apparent to those skilled in this art that various modifications, substitutions and the like can be made without departing from the scope of the invention, as defined by the claims appended hereto.

What is claimed is:

1. An internal spool shaped non-magnetic support structure of an inductor type dynamoelectric machine, said structure serving to support and accurately position a plurality of stationary, generally U-shaped, longitudinally extending armature elements circumferentially distributed about a central longitudinal axis, each U-shaped armature element comprising a winding bearing base portion extending parallel to said longitudinal axis with a leg extending from each end of said base portion in a radially inward direction, said support structure comprising:
   a central cylindrical tube concentric with said axis; and
   a laminate annular end plate located at each end of said tube and extending radially outward relative to said longitudinal axis, each end plate having substantially parallel axially inner and outer surfaces extending between radially inner and outer edges, each end plate possessing: a rabbet along the radially inner edge near the axially inner surface configured to mate with a corresponding end of said tube, a plurality of spaced apart recessed landings circumferentially distributed about the outer edge and configured to receive and position the base portions of the armature elements, and a plurality of spaced tabs bent out of a plane containing said end plate, said tabs extending away from the axially outer surface of said plate for receiving and positioning legs of said armature elements between adjacent tabs.

2. The support structure of claim 1 wherein each end plate further comprises a plurality of axially extending cooling ports near the inner edge of the plate.

3. The support structure of claim 2 wherein each of said cooling ports extends in a radial direction beyond an exterior surface of said central tube, whereby cooling fluid can be admitted through said ports to the exterior of said tube.

4. The support structure of claim 3 wherein each of said plurality of tabs is positioned at an angular orientation about the longitudinal axis which is intermediate that of adjacent recessed landings and extends from a location radially intermediate said inner and outer edges.

5. The support structure of claim 4 wherein the plurality of cooling ports are located at angular orientations about the longitudinal axis in alignment with alternative ones of said plurality of tabs.

6. The support structure of claim 4 designed for use with individual armature elements comprised of a plurality of side by side longitudinally extending U-shaped stampings, and wherein said recessed landings are curved such that the radially innermost end of each leg of the individual armature elements lies on a circular locus.

7. The support structure of claim 1 wherein the tabs have an axial extent less than the axial extent of the legs of the armature elements.

8. The support structure of claim 1 wherein each end plate comprises a grouping of coaxial generally flat standardized stampings.

9. The support structure of claim 8 wherein said standardized stampings comprise:
   a first annular stamping having a central bore therethrough of a diameter substantially equal to the diameter of the outer surface of the tube;
   a second annular stamping having a central bore of diameter less than the diameter of the central bore of the first stamping; and a third annular stamping having a plurality of radially convergent spokes which are bent out of plane to form said tabs.

10. The support structure of claim 9 further comprising non-magnetic mechanical securing means for securing together said grouping of coaxial stampings in side by side relationship.

11. The support structure of claim 9 wherein each of said standardized stampings includes a like plurality of said recessed landings and wherein said stampings are positioned with their respective landings angularly aligned; and wherein said first and second stampings are provided with angularly aligned through cut cooling ports near their radially inner edges.

12. The support structure of claim 11 in combination with: a field winding coiled about the outer surface of said tube and adapted for connection to a source of direct current; and a circumferentially distributed plurality of generally U-shaped, longitudinally extending armature elements supported by the end plates of said spool shaped support structure such that each of said armature elements is precisely positioned axially, radially and circumferentially with respect to the longitudinal axis.

13. The structure as recited in claim 12 in combination with a rotor coaxially and rotatively mounted inside said tube, said rotor having cutouts extending axially from each end of the rotor, the cutouts serving to propel cooling fluid through the cooling ports and into contact with the field winding and windings on the armature elements during rotor rotation.

14. The structure as recited in claim 13 further in combination with: housing means for enclosing said support structure, armature elements and field winding; and rotor mounting means connected to said housing means for rotatively mounting said rotor.

15. The support structure of claim 12 wherein each armature element comprises a plurality of side by side longitudinally extending U-shaped stampings and further comprising means for binding together the stampings of each armature element near the elements' radially innermost ends.

16. An internal spool shaped non-magnetic support structure of an inductor type dynamoelectric machine, said structure serving to support and accurately position a plurality of stationery, generally U-shaped, longitudinally extending armature elements, circumferentially distributed about a central longitudinal axis, each U-shaped armature element comprising a winding bearing base portion extending parallel to said longitudinal axis with a leg extending from each end of said base portion in a radially inward direction, said support structure comprising:
a central cylindrical tube concentric with said axis; and
a laminate annular end plate located at each end of said tube and extending radially outward relative to said longitudinal axis, each end plate having substantially parallel axially inner and outer surfaces extending between radially inner and outer edges, each end plate possessing a rabbet along the radially inner edge near the axially inner surface configured to mate with a corresponding end of said tube, a plurality of spaced apart recessed landings circumferentially distributed about the outer edge and configured to receive and position the base portions of the armature elements, and a plurality of through cut axially extending cooling ports spaced along the inner edge of the plate, each of said cooling ports extending in a radial direction beyond an exterior surface of said central tube so that cooling fluid can be admitted through said cooling ports to the exterior of said tube.

17. An internal spool shaped non-magnetic support structure of an inductor type dynamoelectric machine, said structure serving to support and accurately position a plurality of stationery, generally U-shaped, longitudinally extending armature elements, circumferentially distributed about a central longitudinal axis, each U-shaped armature element comprising a winding bearing base portion extending parallel to said longitudinal axis with a leg extending from each end of said base portion in a radially inward direction, said support structure comprising
a central cylindrical tube concentric with said axis; and
an annular end plate comprising a single stamping located at each end of said tube and extending radially outward relative to said longitudinal axis, each end plate having substantially parallel axially inner and outer surfaces extending between radially inner and outer edges, each end plate possessing: a plurality of spaced apart recessed landings circumferentially distributed about the outer edge and configured to receive and position the base portions of the armature elements, a first plurality of spaced tabs bent out of a plane containing said end plate and extending away from the axially outer surface of said plate for receiving and positioning legs of said armature elements between adjacent ones of said tabs, and a second plurality of spaced tabs bent out of said plane and extending inwardly from the axially inner surface of said plate, said second plurality of tabs being radially positioned to provide a press fit about an exterior surface of an end of said central tube.

18. The support structure of claim 17 wherein each end plate further comprises a plurality of axially extending cooling ports spaced along the inner edge of the plate, each of said cooling ports extending in a radial direction beyond the exterior surface of said central tube whereby cooling fluid can be admitted through said cooling ports to the exterior of said tube.

19. An end plate for a spool-like support of an inductor type dynamoelectric machine, said support serving to mount and position a plurality of circumferentially distributed, longitudinally extending, generally U-shaped armature elements, the end plate comprising:
a grouping of coaxial generally flat standardized stampings, said standardized stampings comprising a first annular stamping having a central bore of first diameter, a second annular stamping having a central bore of diameter smaller than said first diameter, and a third annular stamping having a plurality of radially converging spokes near its central bore which are bent out of plane to form an array of distributed outwardly extending tabs, and at least one of said grouping of standardized stampings having a circumferentially distributed plurality of recessed arcuate landings near its radially outer edge.

20. The end plate of claim 19 wherein first stampings and second stampings within said grouping all contain aligned through cut cooling ports spaced about their respective central bores.

* * * * *